Oct. 6, 1964    C. B. KURTZ    3,151,495
GEARING APPARATUS
Filed Dec. 26, 1961    2 Sheets-Sheet 1
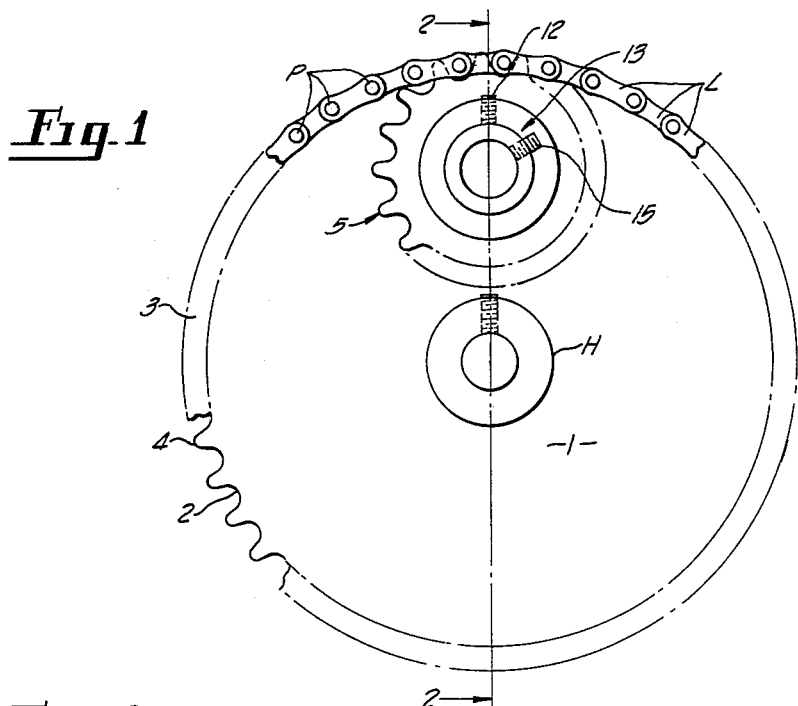
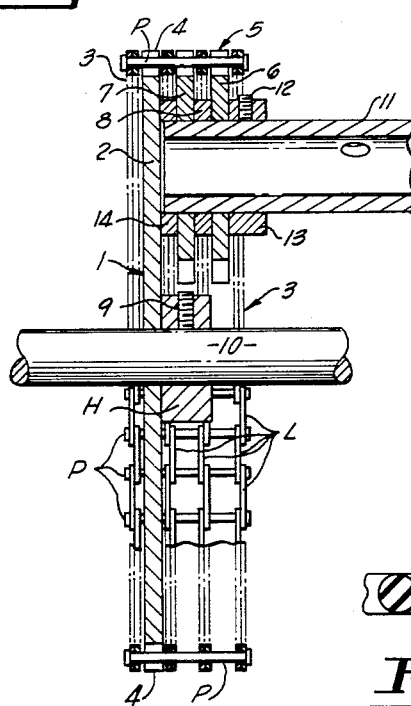
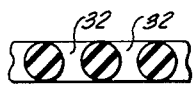
INVENTOR.
CYRUS B. KURTZ
BY
ATTORNEYS Oct. 6, 1964 — C. B. KURTZ — 3,151,495
GEARING APPARATUS
Filed Dec. 26, 1961 — 2 Sheets-Sheet 2

INVENTOR.
CYRUS B. KURTZ
BY
ATTORNEYS

… … …

United States Patent Office 3,151,495
Patented Oct. 6, 1964

3,151,495
GEARING APPARATUS
Cyrus B. Kurtz, 3372 Mayfield Road, Cleveland, Ohio
Filed Dec. 26, 1961, Ser. No. 161,940
7 Claims. (Cl. 74—413)

This invention relates to gears and gearing and speed reducers or "increasers" and more particularly to a gear-like device in which the web and hub parts have a novel, non-integral, flexible and/or floating relation to the part analogous to the "tooth" portion of conventional integrally formed gears.

One illustrative object of my invention is to provide an inexpensive, quiet-running internal-external gearing that has accommodation for appreciable misalignment and eccentricity between the driving and driven elements.

An object is to provide gearing, or so called gearing, generally, whether internal or external that is smooth-running, inexpensive, efficient, self-aligning and/or self-compensating for misalignment and eccentricity.

Another object is to provide a gear, so called, of non-rigidly connected parts comprising a sprocket wheel, for instance, and a multiple row "tooth element" such as a chain or perforate belt or perforate "tire" in a floating relationship which admits free radial displacement of the tire or so called tooth element relative to the sprocket wheel within limits such as the depth of the sprockets in one place, though preferably no more than a small fraction of the depth of the sprockets, and facilitates efficient, smooth running geared engagement with another sprocket wheel with noticeable angular and axial displacement as well as noticeable eccentricity. Another object is to provide an inexpensive, composite, highly adaptable gear, or so called gear, especially though not necessarily adapted for use as the internal gear of an internal-external or planetary gear train. Another object is to provide a robust, quiet and cheap gear and gearing speed reducers and/or increasers as well as internal-external, planetary and other gearing.

Other objects and advantages of my invention will appear from the following description of a preferred form of my invention, reference being had to the accompanying drawings in which:

FIGURE 1 is a side elevation of an internal-external gearing embodying my invention.

FIGURE 2 is a vertical sectional view taken in the plane of the line 2—2 of FIG. 1.

FIGURE 3 is a plan view of a fragment of an alternative form tire, belt or part analogous to the tooth element of conventional gears.

FIGURE 4 is a section on the line 4—4 of FIG. 3.

FIGURE 5 is a plan view of a fragment of another alternative form of the belt or tire part of a gear embodying my invention.

FIGURE 6 is a section taken on the line 6—6 of FIG. 5.

FIGURE 7 is a longitudinal sectional view taken on the line 7—7 of FIG. 3.

Figure 8:
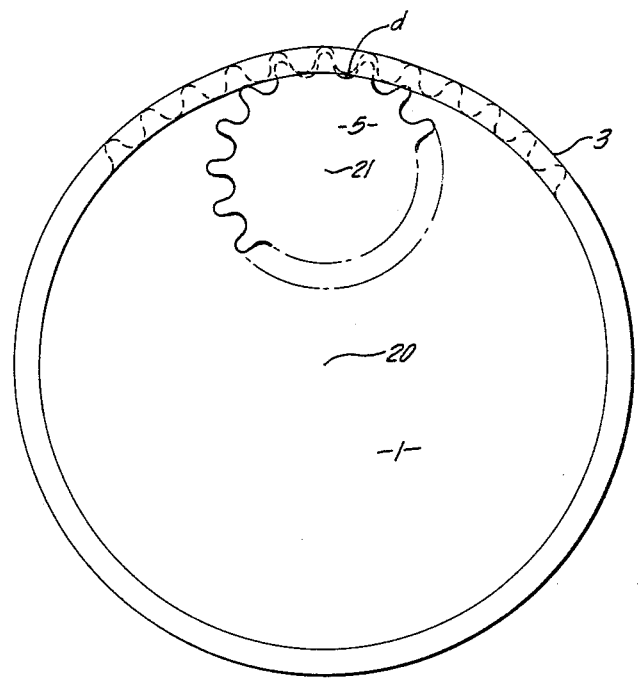
Figure 9:
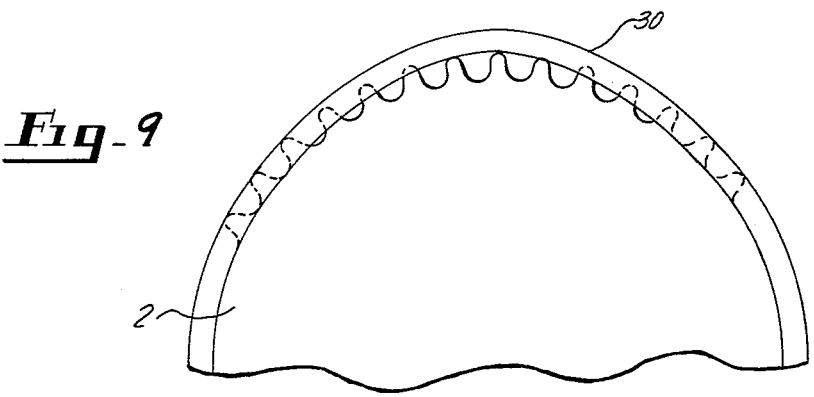

FIGURE 8 is a partly diagrammatic view of the parts more fully drawn in FIG. 1 showing, however, the relation of the sprocket wheels and the belt or tire in an eccentric relation of the sprocket wheels and the "floating" of the belt or tire to accommodate the same, and FIGURE 9 is a fragmentary view similar to FIG. 8 as to the larger sprocket wheel showing the belt or tire floating with respect to the upper sprocket teeth.

Referring to the preferred form of my invention shown in FIGS. 1 and 2 the composite gear 1 comprises the sprocket wheel 2 with the multiple row chain 3 serving in lieu of the conventional toothed element, and to which I shall sometimes refer as the floating belt or tire of the gear. As better shown in FIG. 2 the tire is offset with respect ot the wheel with all the individual sprockets 4 of the wheel engaged in one of the marginal rows of the sprocket-receiving holes, spaces and/or places in the chain. I'll call the sprocket-receiving holes, etc. of the chain or other belts or tires, "sockets," and mean, inter alia, the free-fitting, female counterpart of the sprockets, freely receptive thereof and adapted to coact therewith for the uses and purposes of my invention. Preferably the chain 3 has a noticeably free, flexible, "floating" engagement with the sprockets 4 of the sprocket wheel such that the chain can be moved or wiggled more or less radially with respect to the sprockets at any one part of the wheel at a time not less than about 0.010" and ordinarily but little more than about the full height of a sprocket, FIGS. 8 and 9. One may call this order of engagement between the sprocket wheel and the co-acting chain, belt or tire of my composite gear "static" engagement because it admits no essential circumferential slip or change of angular relation between the wheel and the chain or tire, and I'll call the relation between the composite gear and any other "gear" or sprocket wheel, such as the gear 5, a running or geared engagement.

The sprocket wheel 1 may have a conventional or spot-welded-on hub H for driving attachment to its shaft 10 as illustrated by set-screw 9. My reference to set screws for attaching gears to the shaft suggest suitability for rather light loads. Those skilled in the art will understand that keys and splices and other stouter known means of attachment between gears and the shafts should prudently be provided to practice and enjoy my invention with heavier loads. As shown in FIGS. 1 and 2 the gear 1 is carried by and attached to shaft 10, and the gear 5 is carried by and attached to a parallel shaft 11. In practice these shafts will be rotatably supported and axially located in appropriate bearings, not shown, and the bearings and gearing supported and located in an appropriate case or housing, not shown, according to old and well known teachings which I need not illustrate or describe, nor divert further from describing the novel features and accomplishments of my invention.

As illustrated in FIGS. 1 and 2 the internal gear of the internal-external system shown therein comprises a pair of small sprocket wheels 6 and 7 spaced apart for correct axial alignment with the sockets S of the open rows thereof of the chain 3 as by a spacing washer 8 welded therebetween to form an integral double sprocket wheel; the whole being drivably connected to the shaft 11 by a set screw 12 and collar 13, the latter being welded to the gear 5. An anti-friction washer 14 may be carried on the end of the shaft 11 and interposed between the gear 5 and the adjacent face of the sprocket wheel 1 and normally slight-spaced therefrom to preserve the gears and aid in the desired alignment thereof and in the alignment of the sprockets of the gear 5 with the middle and rightward (as viewed in FIG. 2) rows of sockets of the chain. I prefer to make the shaft 11 hollow with an I.D. receptive of a shaft the size of the shaft 10 so that a plurality of systems such as shown in FIGS.1 and 2 may be coupled together for correspondingly greater speed reduction. A set screw 15 in the shaft 11 will illustrate a way of making such a connection.

For a speed reducing arrangement the shaft 11 and the gear 5 will be the driving shaft and gear; the gear 1 and shaft 10 being driven. Since the chain has full load bearing engagement with substantially all the sprockets of the wheel 2 the chain can transmit more torque to the wheel 2 than it can receive, and vice versa, from one small sprocket wheel 6 or 7, for instance. By mere rule of counting sockets that are engaged by sprockets for torque transmission, it follows that it is efficeint to employ a plurality of sprocket wheels such as 6 and 7 or more in the gear 5 to develop the potential strength of the system to the useful limit of the strength of the multiple row chain or other form of tire. It also follows that in a planetary system or otherwise where a plurality of gears, internal or external, on separate shafts are engaged in running contact with the open rows of sockets of the tire of the composite gear that the distribution of a plurality of tire engaging socket wheels circumferentially will test the strength of the tire probably more efficiently and economically than an axially disposed plurality on a single shaft. I am aware that shearing stresses may be multiplied deleteriously should the axial dimension of the tire and the number of rows of sockets be extended unduly from the sprocket wheel of the composite gear. I suggest that the tire be not necessarily mounted on the sprocket wheel 2 on one of the marginal rows of sockets of the tire, but where the system of gearing advantageously permits that the tire and sprocket wheel of the composite gear be connected along an inner row of sockets of a multiple row tire and for running engagement with single or multiple sprocket wheels on opposite axial sides of the composite gear.

When the tire of the composite gear takes the form of the chain 3, it may be attached to the sprocket wheel 2 by wrapping the proper or sufficient length of chain around the wheel and then inserting the last pin P through the appropriately aligned holes in the proximate links L to make the chain endless and attached to the wheel. Since as I prefer the "pitch" circle of the tire 3 to be freely as great or somewhat greater than the pitch circle of the sprocket wheel 2, the assembly of the tire on the wheel need involve no awkward stressing or straining of the parts or the person doing the work. The employment of a chain for a tire has this advantage. When the tire, chain 3 for instance, has freedom of limited radial and wiggly movement relative to the sprocket wheel and "floats" within desirable limits with respect thereto, great and useful accommodation with the gears having otherwise imperfect running or geared engagement therewith is affected. Should the shafts 10 and 11 depart from parallelism or from the intended center-to-center spacing or gain unintended eccentricity by wear or otherwise, the float of the tire 3 on sprocket wheel 2 as well as the free fit between the sprockets of the gear 5 and the open sockets of the tire will compensate for such departure without impairing the quietness or mechanical efficiency of the system deleteriously.

In FIG. 8, I have undertaken to suggest diagrammatically a situation wherein the spacing between the center 20 of the composite gear 1 and the center 21 of the enmeshed gear 5 is greater than the distance which would cause the pitch circles of these gears to lie in the same cylinder at the point of tangency whereby the tire 3 is lifted appreciably, as shown at the top of the figure, and is caused to float upwardly by the gear 5 a distance $d$ as measured between the roots of the sprockets, as viewed in FIG. 8. Under such a condition, the floating of the tire on the composite gear does not appreciably diminish the strength of the engagement between the tire and the sprocket wheel thereof and literally enhances the engagement between the engaged gear 5 and the tire 3. While the floating of the tire of the composite gear is shown with some exaggeration for most purposes in FIG. 8, it is intended to illustrate the advantage which my invention takes of the desirable tendency of the practicable attachment of the tire which the sprocket wheel affords, if not requires.

In FIGS. 3, 4 and 7 there is depicted an alternative form of tire to be employed in lieu of the chain or tire 3 heretofore illustrated and discussed. In these later figures, the tire may take the form of a flexible, rubber-like or plastic belt 30, preferably having longitudinal wire, cord or cable reinforcements 31, FIG. 4, and having molded sockets 32, see also FIG. 7, for free coaction with the sprockets of the sprocket wheel 2 to comprise the composite gear 1 and for free, quiet and efficient meshed running engagement with such gears as the gear 5 through the sprockets thereof. Should it be desired that the tire 30 be made in endless form in the first instance, it may be made with a circumferential length enough greater than the pitch circle of the sprocket wheel 2 to be fitted thereupon as suggested in FIG. 9. That is to say, the tire 30 may have engaged all of the sprockets of the wheel 2 in the course of assembly except the uppermost ones as shown, which permits the tire to be joggled into free floating engagement with the wheel without requiring the tire to be spliced onto the tire where splicing may be inconvenient or undesirable for other reasons. Whether the tire 30 had as much float as is suggested in FIG. 9 or be spliced onto the sprocket wheel with less float, it will have substantially all the advantages of the chain 3 as an element of the sprocket wheel, substantially as much strength depending on the nature of the reinforcements 31 and the added advantage of quietness. Should the conditions of service be such as to require a lubricant, those skilled in the art will elect neoprene or plastics with which convenient lubricants are compatible. I have in mind, as do those skilled in the art, that such material as nylon may be employed in the making of the tire 30 and under appropriate conditions of load and speed by self-lubricating or free from the need of separately supplied lubricants.

In FIGS. 5 and 6 a third form of tire for the composite gear is intended to be taught: comprising a metallic belt 40 with perforations 41 corresponding to the sockets S and 32 of the tires 3 and 30 and adapted to be substituted for such tires where the same would be advantageous or desirable. Such a metallic belt can have about the same length as the pitch circle of the wheel 2 and be assembled thereon by wrapping around and butt-welding the proximate ends in situ in the way band saws are spliced. Alternatively, the belt may be made a little longer, FIG. 9, and given original endless form and assembled on the wheel by joggling and twisting a bit as described above with reference to FIG. 9. Preferably, the belt 40 is thin and flexible and like the tires 3 and 30 given to flexing as well as floating in its engagement with the sprocketed periphery of the wheel 2. The advantage of my invention need not be diminished deleteriously by relative stiffness in the belt 40 compared with the tires 3 and 30 where, for example, relative strength in internal shear in the tire is sought, and, preferably, where some floating is preserved between the tire and the wheel 2. Should it be desirable to employ a metallic belt 40 of such stiffness as to impair assembly onto the wheel 2 by the method suggested in FIG. 9, recourse butt-welding or brazing in situ at one or more peripheral places will facilitate assembly to make a composite gear with the sprocket wheel.

While I have illustrated and described a preferred and certain modified forms of my invention, I do not want my patent to be necessarily limited to the forms herein specifically illustrated and described, nor limited in any other way inconsistent with the progress by which my inventon has promoted the art.

I claim:

1. A composite gear comprising a sprocket wheel and a tire attached to and snugly engaging the whole periphery of said wheel, said tire having a plurality of axially spaced rows of sockets, said tire engaging all the sprockets of said sprocket wheel in one row of sockets, and said gear being engageable internally in another of said rows by another axially offset sprocket wheel of smaller diameter than said gear at a place of common tangency.

2. The gear of claim 1 wherein said tire is flexible and has a limited freely movable, floating engagement with all said sprockets at all times.

3. A composite gear comprising a sprocket wheel and a tire attached to said wheel and having peripheral engagement with said wheel, said tire having greater axial width than the sprockets of said wheel and having a plurality of circumferentially spaced and axially extended sockets, said wheel engaging the sockets of said tire in one circumferential row of said sockets, and said gear being open and engageable by an axially spaced sprocket wheel in another axially spaced row at a place of tangency common to both said wheels.

4. The gear of claim 3 wherein said tire has freedom for limited radial movement with respect to the sprockets of said first named sprocket wheel at said place of tangency.

5. A composite gear comprising a toothed wheel having axially limited, circumferentially spaced, male teeth, and a tire attached to said wheel having a plurality of female teeth spaced circumferentially approximately the same as said male teeth and of greater axial extent than said male teeth, said tire engaging all the male teeth of said wheel all the time and for only part of the axial extent of the female teeth with the remaining extent of said female teeth adapted to mesh with a second toothed wheel having its axis radially offset from said first axis and having teeth axially offset from the teeth of said first wheel at a place of tangency common to both wheels, said tire being flexible and having freedom for limited radial motion with respect to the teeth of said first wheel adjacent said place for full, quiet mesh with said second wheel.

6. The combination of a composite gear comprising a sprocket wheel having an axis and a coaxial tire snugly encompassing and attached to said wheel, said tire having circumferentially spaced, axially extending sockets, said tire engaging all the sprockets of said wheel in only part of the axial extent of the sockets and leaving part of the axial extent of said sockets open, and a second sprocket wheel having an axis radially spaced from and parallel with the axis of the first wheel and engaging the said open axial extent of said sockets at a place of tangency common to both wheels, said tire being flexible and having limited freedom to float radially with respect to the sprockets of said first wheel at said place and give full, quiet mesh with said second wheel.

7. The combination of a composite gear comprising a toothed wheel having axially limited, circumferentially spaced, male teeth and a tire attached to said wheel and having a plurality of female teeth spaced circumferentially approximately the same as said male teeth and of greater axial extent than said male teeth, said tire engaging all the male teeth of said wheel all the time and for only part of the axial extent of the female teeth, and a second toothed wheel having its axis radially offset from said first axis and having teeth axially offset from the teeth of said first wheel and engaging axially adjacent parts of said female teeth at a place of tangency common to both wheels, said tire being flexible and having limited freedom of floating motion with respect to the teeth of said first wheel adjacent said place providing full, quiet mesh with said second wheel.

References Cited in the file of this patent

UNITED STATES PATENTS

| | | |
|---|---|---|
| 1,159,486 | Froelich | Nov. 9, 1915 |
| 1,193,419 | Pierce | Aug. 1, 1916 |
| 1,556,399 | Bartleth | Oct. 6, 1925 |
| 1,965,145 | Klaucke | July 3, 1934 |
| 2,042,608 | Lee | June 2, 1936 |
| 2,408,666 | Mallard | Oct. 1, 1946 |
| 2,451,683 | Mantle | Oct. 19, 1948 |
| 2,659,220 | Cherry | Nov. 17, 1953 |
| 2,753,731 | McWethy | July 10, 1956 |
| 3,015,972 | Voigt | Jan. 9, 1962 |
| 3,108,488 | Huszar | Oct. 29, 1963 |

FOREIGN PATENTS

| | | |
|---|---|---|
| 19,608 | Great Britain | Sept. 24, 1904 |